United States Patent Office 3,048,693
Patented Aug. 7, 1962

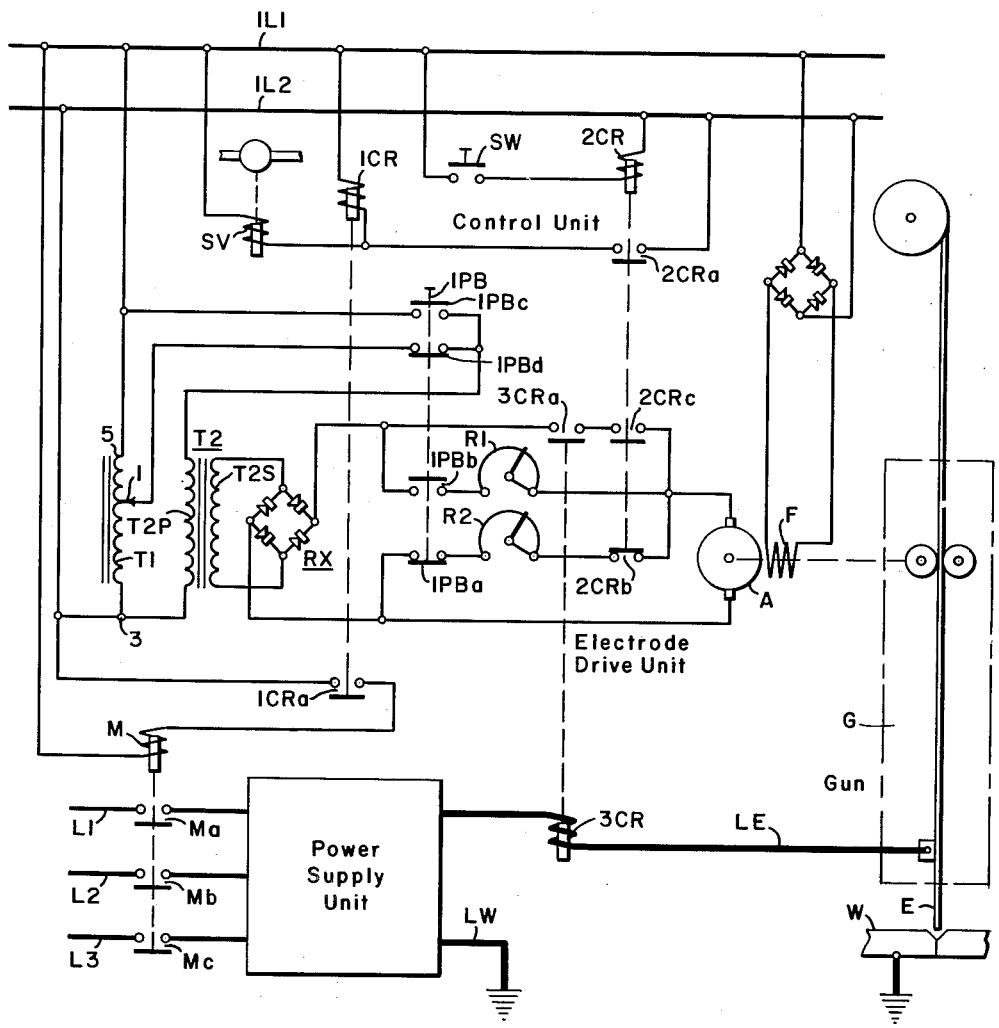

3,048,693
ARC WELDING APPARATUS
Floyd E. Adamson, Kenmore, N.Y., and Harry J. Bichsel, Geneva, Switzerland, assignors to Westinghouse Electric Corporation, East Pittsburgh, Pa., a corporation of Pennsylvania
Filed Nov. 27, 1959, Ser. No. 855,635
5 Claims. (Cl. 219—131)

This invention relates to the arc-welding art and has particular relationship to semiautomatic welding in which the weld is produced by an arc between a consumable electrode and the work and the consumable electrode is advanced towards the work by a motor connected in driving relationship with the electrode. To the extent that this invention is applicable to arc melting, it is understood that arc melting is within the scope of the claims presented herein which for brevity's sake refer to arc welding.

In semiautomatic welding, it is important that the electrode be advanced towards the work at a relatively constant rate. While this condition is of importance where the welding power supply is of the constant-current variable-voltage type as disclosed in Croco Patent 2,752,529, it is of prime importance where the power supply is of the constant-potential type as disclosed in Bichsel Patent 2,786,160. In welding with a constant-potential welding power supply, even small variations in the speed of the electrode will disturb equilibrium conditions in the arc and cause undesired variations in the weld bead. It may also cause turbulence in gas shielded arcs with the resultant detrimental effects to the weld bead. This condition has been met in accordance with the teachings of the prior art by providing elaborate speed-control means for the motor driving the electrode. Such speed control means has operated satisfactorily in many instances but has proved costly.

It is then an object of this invention to provide arc-welding apparatus particularly for welding work with a consumable electrode energized from a power supply of the constant-potential type in the use of which the speed of the electrode shall be maintained substantially constant without elaborate facilities for compensating for variations in the speed of the motor driving the electrode as it is loaded to a variable extent by the irregularities in the electrode and the feeding equipment from which the electrode is derived.

Another object of this invention is to provide such arc-welding apparatus including novel facilities for inching the electrode towards the work.

An incidental object of this invention is to provide a novel motor energizing circuit including novel facilities for inching the motor.

In accordance with this invention, arc-welding apparatus for welding work with a consumable electrode is provided in which the electrode is driven by a motor having a flat speed-torque curve and of adequate rating so that the speed of the motor and the rate at which it advances the electrode towards the work is not affected by the variation in the loading of the electrode on the motor in spite of the fact that no speed compensating means is provided. The electrodes which are customarily used in the practice of this invention have a diameter of from approximately .020 inch to about 3/16 inch and are driven at the rate of the order of several hundred inches per minute. Electrode driving apparatus in accordance with this invention for welding with electrodes of this range of diameters includes an electrode drive motor of about 1/4 horsepower having a relatively flat speed-torque curve. The armature of this motor is supplied through a rectifier from a power supply including a variable transformer. The transformer varies the voltage impressed across the armature and thus the speed of the motor may be varied.

In welding with this apparatus with the motor supply entirely uncompensated, that is, with the only control of the motor the manual control afforded by the variable transformer it has been found that the speed of the electrode is maintained substantially constant at any setting in spite of the variable loading which the load may impose upon the motor. It has also been found that the electrode speed is maintained constant not only in welding with electrodes within the range of .020 inch to 3/16 inch but in welding with electrodes having a diameter as high as 1/8 inch or higher.

In accordance with a further aspect of this invention, arc-welding apparatus of the type just described with novel inching facilities is provided. This apparatus includes an inching switch means which may be operated in any setting of the variable transformer without resetting the transformer during the inching. The inching switch in this apparatus includes a pair of front contacts, one for closing the electrode drive motor circuit and the other for connecting this circuit to the supply and a pair of back contacts, one for opening the dynamic braking circuit, and the other for disconnecting the motor power supply from the output terminals of the variable transformer and connecting this supply to the input terminals of the variable transformer so that during inching the motor is supplied independently of the setting of the variable transformer. Thus, following the inching it is not necessary to reset the transformer to the proper drive magnitude at which it may have been set originally after careful experimentation to determine the proper setting.

The novel features considered characteristic of this invention are disclosed generally above. This invention, both as to its organization and as to its method of operation, together with additional objects and advantages thereof, will be understood from the following description of a specific embodiment taken in connection with the accompanying drawing, in which the single FIGURE is a schematic showing of a preferred embodiment of this invention.

The apparatus in accordance with this invention includes a Gun, a Power Supply Unit, an Electrode Drive Unit and a Control Unit. These cooperate to weld work W with a consumable electrode E. The Power Supply Unit is energized from conductors L1, L2 and L3 which are adapted to be connected to the buses of a three-phase supply through the usual disconnects or circuit breakers (not shown). The conductors L1, L2 and L3 are connected to the Power Supply Unit through the contacts Ma, Mb and Mc of a contactor M which is energized on the closing of contact 1CRa of a relay 1CR in the Control Unit. Conductors 1L1 and 1L2 are provided for energizing the other parts of the apparatus. These conductors may be energized from two of the conductors L1, L2, L3 through an appropriate transformer (not shown) or directly.

The Gun may be of the type shown in Miller Patent No. 2,806,125 or the like. Electrode E is of the consumable type and is advanced towards the work W through the Gun G.

The Power Supply Unit is preferably of the constant potential type such as is disclosed in the Bischel Patent 2,786,160. This Unit has output conductors LE and LW adapted to be connected to the electrode E usually through the electrode guide (not shown) in the Gun and the work W respectively. The electrode conductor LE includes a coil of a current relay 3CR which may be an ordinary loop in the conductor LE. This relay 3CR has a front contact 3CRa which is closed when the welding current flows through the conductor LE.

The Electrode Drive Unit includes a motor having an armature A and a field winding F. This motor is of such large rating taking into consideration the loading on the motor imposed by the electrode that with no compensating control in the motor, it is capable of advancing the electrode E at substantially constant speed regardless of variations in the loading. The armature A of the motor is connected in driving relationship with the electrode E through electrode drive rolls both of which may be positively driven as disclosed in Bichsel Patent 2,823,331 (FIG. 2).

The Electrode Drive Unit is energized from conductors 1L1 and 1L2. The motor is supplied with direct current from a rectifier RX energized from the secondary T2S of a transformer T2, the primary T2P of which is supplied with potential from the output terminals 1 and 3 of a variable transformer T1. The input terminals 5 and 3 of T1 are connected to the conductors 1L1 and 1L2. Where the motor is of the type in which the armature requires of the order of 100 volts transformer T2 may be omitted and the rectifier RX connected in the same way that T2P is now connected.

When the motor is at rest the armature A is shunted by a variable braking resistor R2 through a back contact 1PBa of an inching pushbutton 1PB and a back contact 2CRb of a relay 2CR. Both 1PB and 2CR are in the Control Unit. It is essential that the resistor R2 be properly set so that it performs its braking function properly in view of the high rating of the motor. During welding the armature A is adapted to be connected to the direct-current terminals of the rectifier RX through front contact 3CRa and front contact 2CRc of relay 2CR. During inching the direct-current terminals of RX are adapted to be connected in energizing relationship with the armature A through the front contacts 1PBb of the inching pushbutton 1PB through a variable resistor R1. The inching pushbutton 1PB has in addition to the contacts 1PBa and 1PBb, a front contact 1PBc and a back contact 1PBd. During inching 1PBd and 1PBc operate to disconnect the output terminal 1 of the variable transformer T1 from the primary T2P and to connect the line 1L1 to T2P. During inching the power supplied to the motor is then not affected by the setting of T1.

The Control Unit includes in addition to the relays 1CR, 2CR and pushbutton 1PB, a start switch SW. The Control Unit also includes a solenoid SV for controlling the supply of shielding gas to the Gun G. There may also be a solenoid (not shown) for controlling the cooling water to the Gun G.

The coil of the relay 2CR is adapted to be connected between conductors 1L1 and 1L2 through start switch SW. The coil of relay 1CR and the solenoid SV are adapted to be connected between conductors 1L1 and 1L2 through front contact 2CRa.

In the standby condition of the apparatus, the disconnects or circuit breakers (not shown) are closed and conductors L1, L2, L3 and 1L1 and 1L2 are energized. The start switch SW is opened and 2CR, 1CR and SV are deenergized. The gas valve is then closed. Transformer T1 is supplied with potential from 1L1 and 1L2. The inching pushbutton 1PB is opened so that T2P is supplied with potential from the adjustable arm of T1. Since 1CR is deenergized 1CRa is open and contactor M is deenergized so that the Power Supply Unit is deenergized. There is no potential between electrode E and work W and relay 3CR is deenergized. Contacts 3CRa and 2CRa are then open in the Electrode Drive Unit maintaining the armature circuit open. The braking resistor R2 is connected across the armature A through the back contact 1PBa and the back contact 2CRb.

Preparatory to an operation, the transformer T1 is set for the approximate desired speed of the electrode E. The inching switch 1PB is then operated repeatedly to thread the electrode E through the Gun. On each operation of the switch 1PB, the braking resistor R2 is disconnected from the armature A and the armature is connected in energizing relationship with rectifier RX through the front contact of 1PB and R1. In addition, the primary T2P is connected directly between conductors 1L1 and 1L2 so that the secondary T2S is supplied with maximum potential. The motor is then energized repeatedly for short intervals until the electrode E is in proper position for striking the arc.

To start an operation, the switch SW is closed and held closed; this actuates relay 2CR closing contact 2CRa and energizing 1CR and solenoid SV. The actuation of solenoid SV permits gas to be supplied to the electrode and the work. When 1CR is energized, 1CRa is closed actuating contactor M and closing Ma, Mb and Mc to energize the Power Supply Unit. Current then flows through conductors LE and LW and through the electrode E and the work W and fires an arc. In addition, relay 3CR is actuated and contact 3CRa is closed and rectifier RX is then connected in energizing relationship with the armature A through now closed contacts 3CRa and 2CRc. Contact 2CRb is opened by the energization of relay 2CR disconnecting the braking resistor R2 from the armature A. The motor is now energized and the electrode E is advanced into the arc producing the weld. Because of the rating of the motor, the electrode is advanced at a substantially constant speed and a stable welding operation is carried out.

At the end of the welding operation, SW is released and 2CR drops out. 1CR is deenergized causing M to drop out to deenergize the Power Supply Unit. SV is closed stopping the gas flow. The motor is deenergized at 2CRc and is brought to rest substantially instantaneously by the closing of 2CRb and the connection of R2 across the armature.

While a preferred embodiment of this invention has been disclosed herein, many modifications thereof are feasible. This invention then is not to be restricted except insofar as is necessitated by the spirit of the prior art.

We claim as our invention:

1. In arc welding apparatus in which work is welded with a consumable electrode by an arc between said electrode and work, a drive for said electrode including a motor having an armature, means connected to said armature for connecting said armature in driving relationship with said electrode, and power-supply means for said motor including variable transformer means having input and output terminals and including means connected to said output terminals for connecting said output terminals to impress an energizing potential across said armature which is substantially independent of the arc potential between said electrode and work, the potential across said armature being variable only by varying the output of said transformer, said motor having a relatively flat speed-torque curve and a load rating such that in the absence of compensation the variation in the loading on said motor by the driving of said electrode has substantially no effect on the speed of said electrode.

2. In arc welding apparatus in which work is welded with a consumable electrode by an arc between said electrode and work, a drive for said electrode including a motor having an armature, means connected to said armature for connecting said armature in driving relationship with said electrode, and power-supply means for said motor including variable transformer means having input and output terminals, additional transformer means including primary means and secondary means, means connecting said output terminals to said primary means, and means connecting said secondary means in energizing relationship with said armature, the potential across said armature being substantially independent of the arc potential between said electrode and work and being variable only by varying the output of said transformer, said motor having a relatively flat speed-torque curve and load rating such that in the absence of compensation the variation in the loading on said motor by the driving of said electrode has substantially no effect on the speed of said electrode.

3. In arc welding apparatus in which work is welded with a consumable electrode by an arc between said electrode and work, a drive for said electrode including a motor having an armature, means connected to said armature for connecting said armature in driving relationship with said electrode, power-supply means for said motor including a variable transformer having input and output terminals, an additional transformer having primary and secondary means, means connecting said output terminals in power-supply relationship with said primary means, means connecting said secondary means in an energizing circuit with said armature, said nergizing circuit impressing an energizing potential across said armature which is substantially independent of the arc potential between said electrode and work, said circuit being open in the standby condition of said apparatus, an inching switch means for inching said electrode including first contact means connected to said energizing circuit for closing said energizing circuit on actuation of said switch means and also including second contact means connected to said primary means for disconnecting said primary means from said output terminals and connecting said primary means to said input terminals on actuation of said switch means.

4. Apparatus for arc welding work with a consumable electrode by an arc between said electrode and work, said apparatus comprising power-supply means of the constant-potential type, means connected to said supply means for connecting said supply means in power-supply relationship with said electrode and said work so that said supply means produces and maintains an arc between said electrode and said work, drive means for said electrode including a motor, means connected to said motor for connecting said motor in driving relationship with said electrode so that said electrode is fed into said arc, means connected to said motor for impressing a potential across said motor to energize said motor, said potential being substantially independent of the arc potential between said electrode and work during the welding operation, and said motor having a relatively flat speed-torque curve and a load rating such that in the absence of compensation, variation in the loading on said motor by the driving of said electrode has substantially no effect on the speed of said electrode, whereby the feeding of said electrode into said arc remains substantially uniform.

5. In arc welding apparatus in which work is welded with a consumable electrode by an arc between said electrode and work, first power-supply means of the constant potential type, means connecting said supply means to said electrode and work to produce said arc therebetween, a drive for said electrode including a motor having an armature, means connected to said armature for connecting said armature in driving relationship with said electrode, and second power-supply means for said motor connected to said motor, said supply means impressing an energizing potential on said motor which is substantially independent of the arc potential between said electrode and work during the welding operation and said second supply means including only manual control means for setting the potential impressed in said armature to set the speed of said motor, said motor having a relatively flat speed-torque curve and a load rating such that in the absence of compensation the variation in the loading on said motor by the driving of said electrode has substantially no effect on the speed of said electrode.

References Cited in the file of this patent
UNITED STATES PATENTS

| | | |
|---|---|---|
| 1,508,742 | Carichoff | Sept. 16, 1924 |
| 2,371,894 | Kennedy et al. | Mar. 20, 1945 |
| 2,519,216 | Armstrong | Aug. 15, 1950 |
| 2,536,294 | Landis et al. | Jan. 2, 1951 |
| 2,773,231 | Adriansen et al. | Dec. 4, 1956 |
| 2,787,751 | Davidson | Apr. 2, 1957 |
| 2,806,127 | Hackman | Sept. 10, 1957 |